Figure 7:
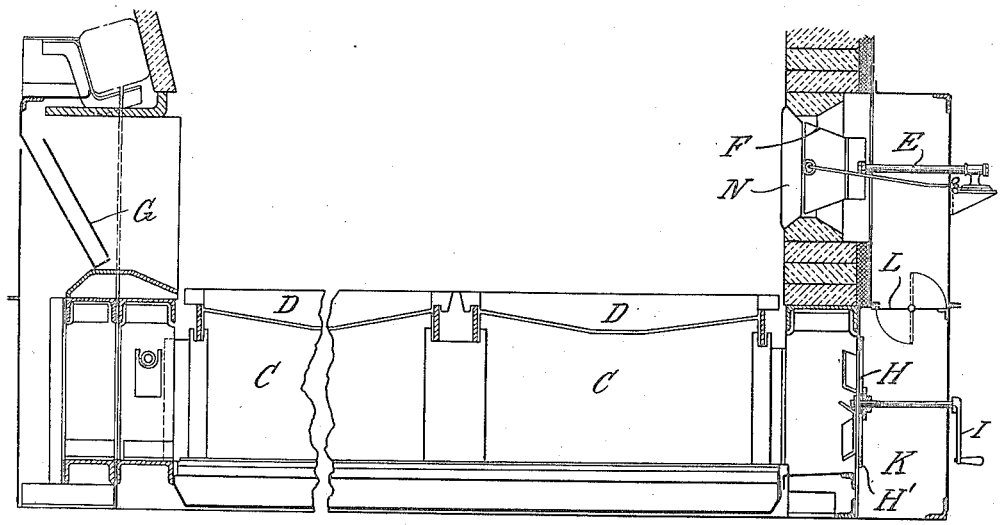

A. SPYER.
BOILER FURNACE.
APPLICATION FILED DEC. 22, 1920.
1,390,225.
Patented Sept. 6, 1921.
7 SHEETS—SHEET 1.
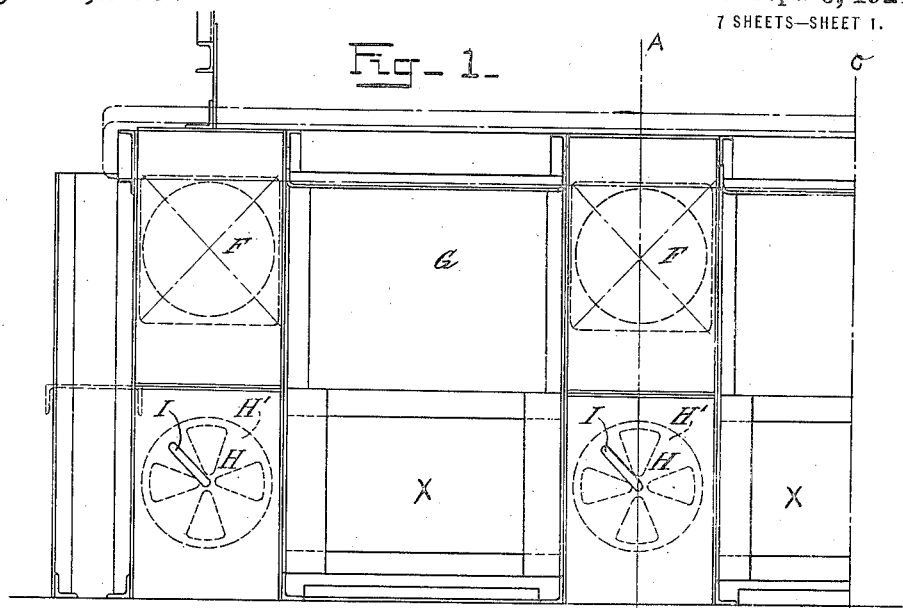
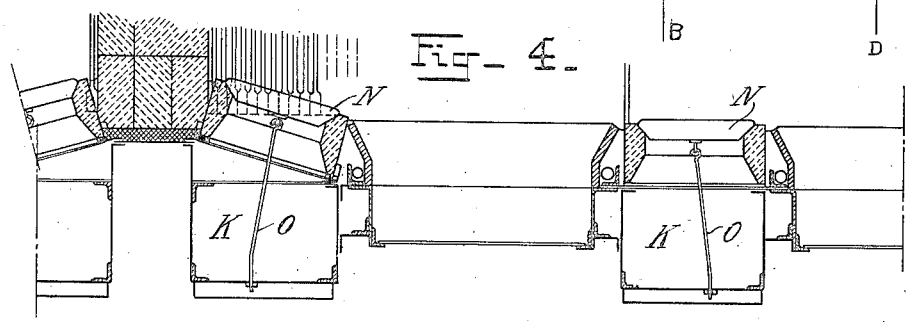
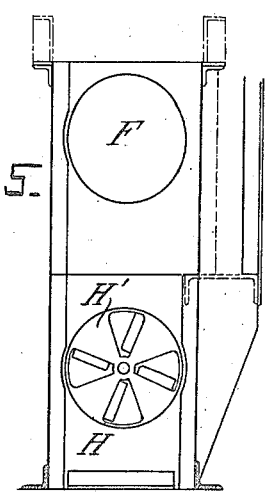
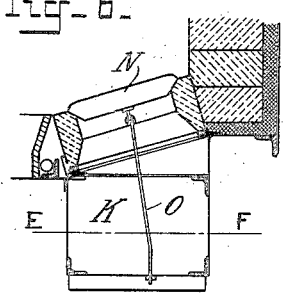
INVENTOR
Arthur Spyer
BY
Gifford & Bull
ATTORNEYS A. SPYER.
BOILER FURNACE.
APPLICATION FILED DEC. 22, 1920.
1,390,225.
Patented Sept. 6, 1921.
7 SHEETS—SHEET 2.
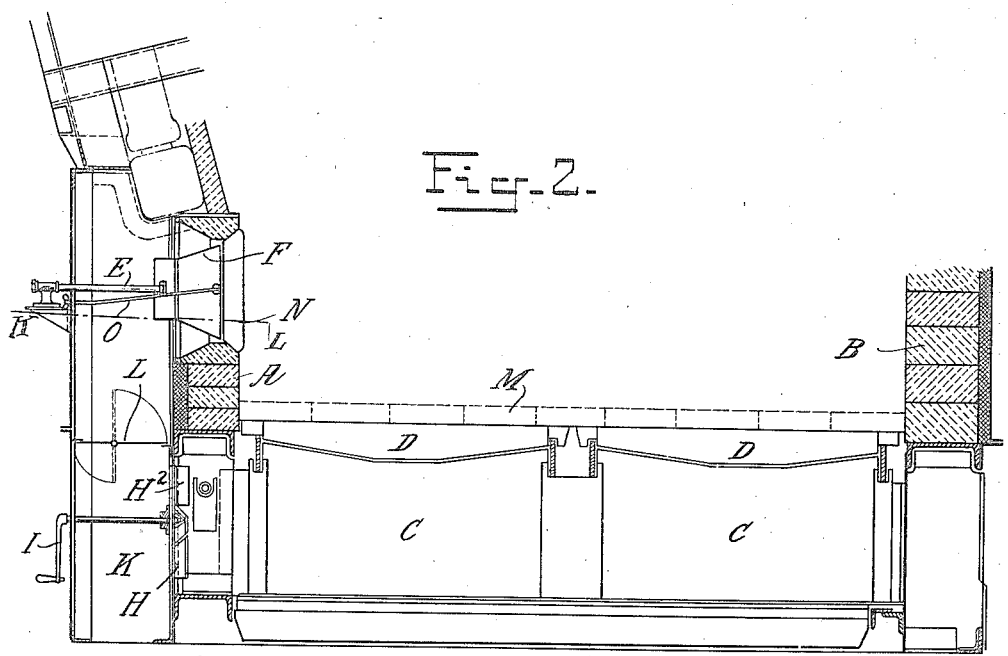
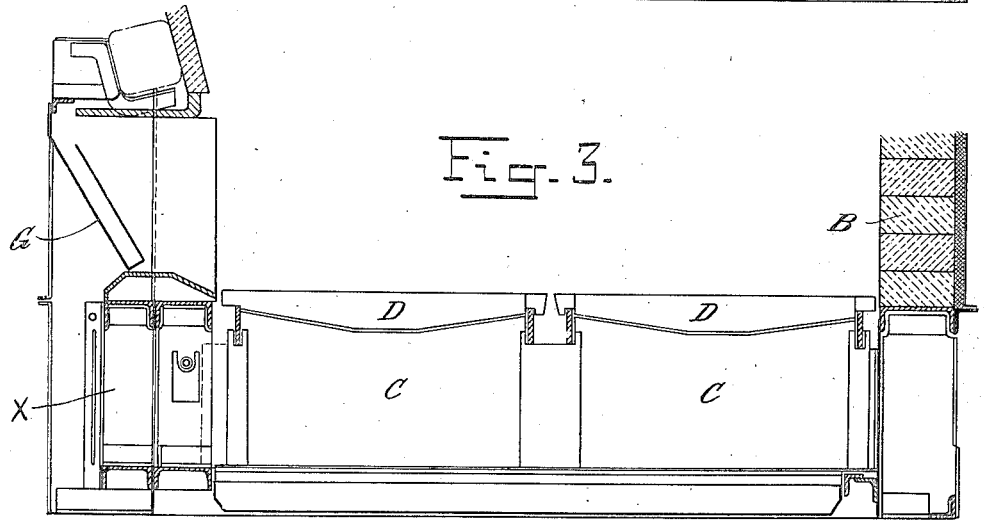
INVENTOR
Arthur Spyer
BY
ATTORNEYS A. SPYER.
BOILER FURNACE.
APPLICATION FILED DEC. 22, 1920.
1,390,225.
Patented Sept. 6, 1921.
7 SHEETS—SHEET 4.
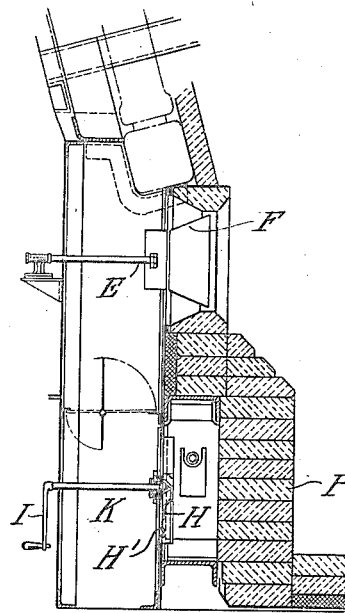
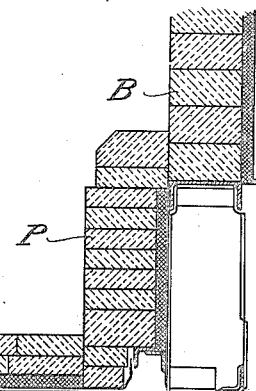
Fig_8_
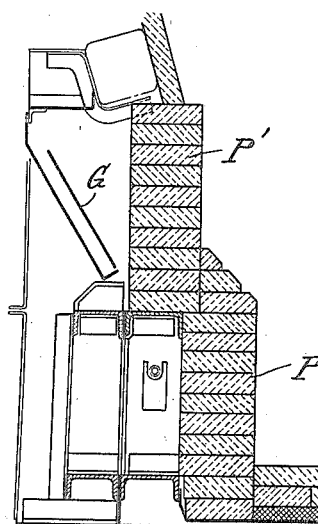
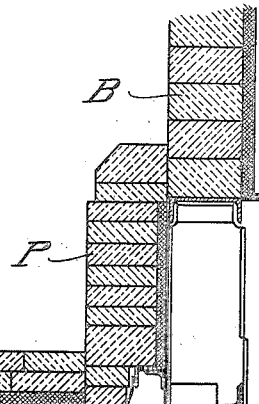
Fig_9_
INVENTOR
Arthur Spyer
BY
Gifford & Bull
ATTORNEYS

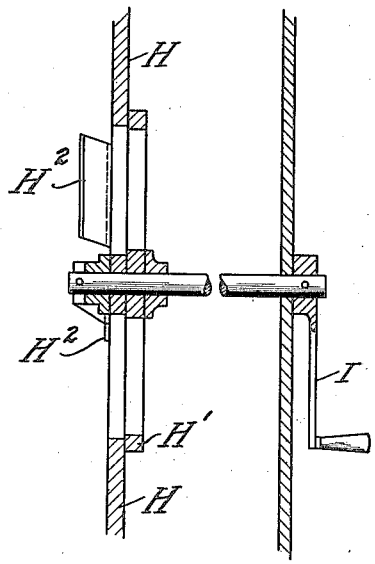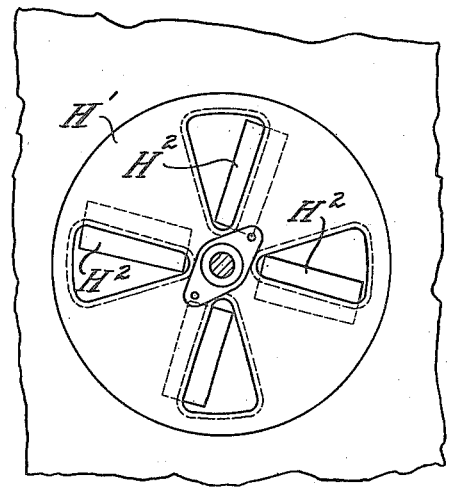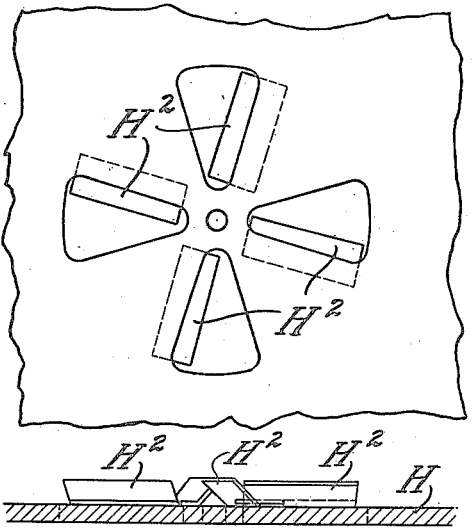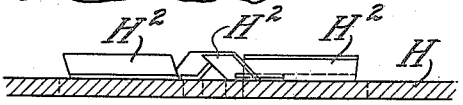

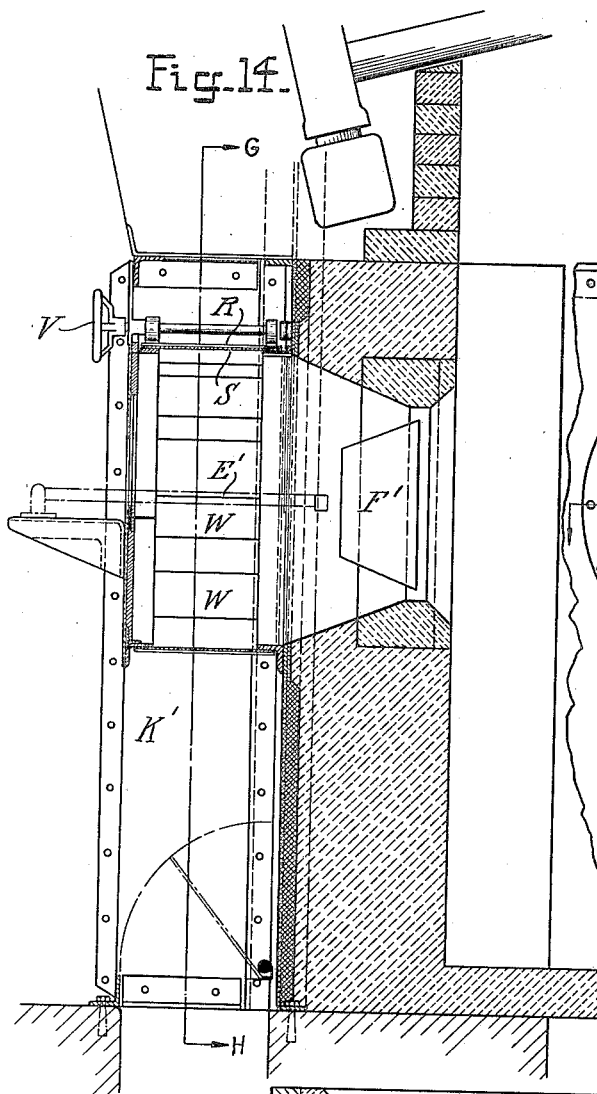
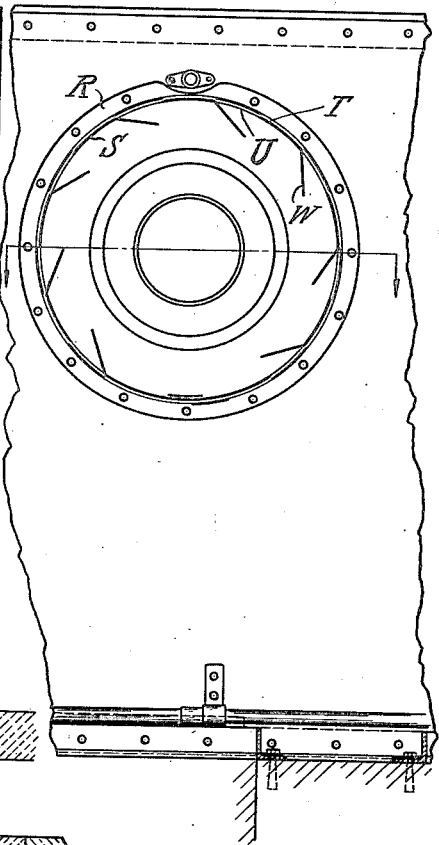
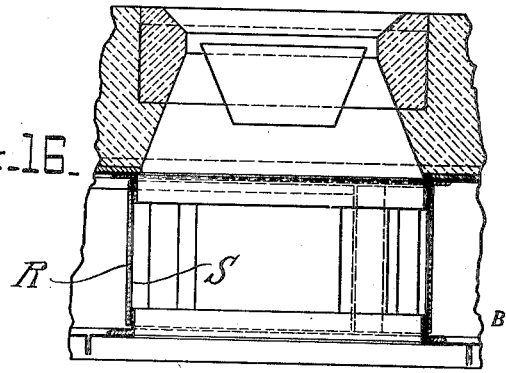

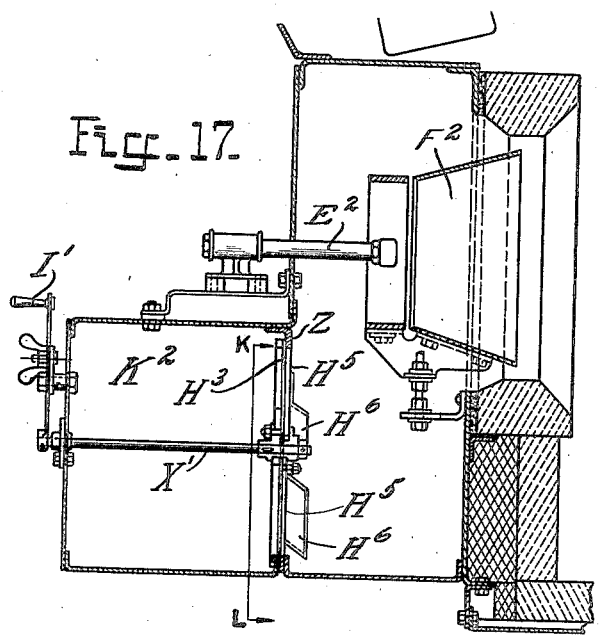
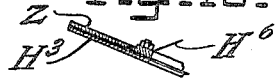
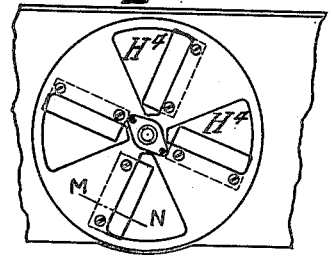
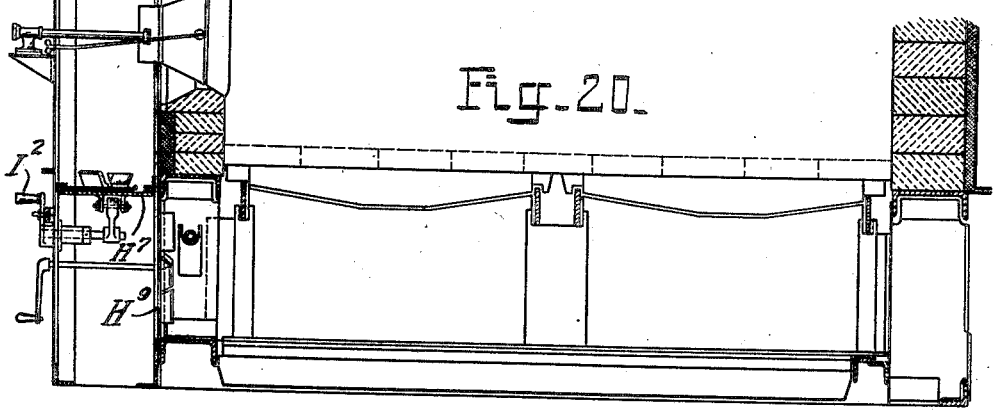

UNITED STATES PATENT OFFICE.

ARTHUR SPYER, OF LONDON, ENGLAND, ASSIGNOR TO THE BABCOCK & WILCOX COMPANY, OF BAYONNE, NEW JERSEY, A CORPORATION OF NEW JERSEY.

BOILER-FURNACE.

1,390,225.   Specification of Letters Patent.   Patented Sept. 6, 1921.

Application filed December 22, 1920. Serial No. 432,590.

*To all whom it may concern:*

Be it known that I, ARTHUR SPYER, a subject of the King of Great Britain, residing at 14 Clarendon Court, Maida Vale, London, England, have invented certain new and useful Improvements in Boiler-Furnaces, (for which I have filed application in England, Nov. 8, 1919, and Feb. 24, 1920, Germany, Oct., 1920, and Spain, Oct. 19, 1920,) of which the following is a specification.

My invention relates to improvements in and connected with boiler furnaces arranged for coal and oil firing and has for its object to provide an improved construction and arrangement of such furnaces whereby they can be converted from coal firing to oil firing and vice versa, without the necessity for any re-construction of the furnaces, and the furnace can also be employed with coal and oil firing simultaneously.

A feature of the invention consists in this, that the ducts or boxes for the supply of air form an integral part of the boiler supporting structure and are in position for use under all conditions of firing, and can be arranged at either end. A further feature consists in this, that the air for coal firing and the air for oil firing are supplied by the same air box or duct.

This arrangement of air boxes or ducts is particularly adapted for the closed air supply system of construction known as the undergrate draft system for coal firing.

Another object of my invention is an improved arrangement whereby the air in passing through the air regulator which controls its admission into the ash pits or into the burners, as the case may be, is suitably controlled or deflected by means of impeller vanes or plates with the object of securing a uniform diffusion of air in the ash pits or around the burner.

A further feature of my invention relates to the regulator in which the impeller plates or vanes are attached to the inner side of the stationary member of the air distributer nearer the furnace.

Other objects of my invention will appear in the specification and will be particularly pointed out in the claims.

My invention is illustrated in the accompanying drawings, in which Figure 1 is an elevation of a portion of the front of a boiler furnace applied to a water tube boiler arranged in accordance with my invention; Fig. 2 is a longitudinal section on the line A—B of Fig. 1; Fig. 3 is a longitudinal section on the line C—D of Fig. 1; Fig. 4 is a sectional plan taken on the line K—L of Fig. 2 through the air cones through which air is supplied for the oil burners; Fig. 5 is a sectional elevation taken on the line E—F of Fig. 6; Fig. 6 is a sectional plan through the center line of the air cone adjacent to the furnace wall of the boiler; Fig. 7 is a longitudinal section of a boiler furnace arranged for coal or oil firing in accordance with the invention, in which the air supply for the oil burners and the ash pits is located at the rear of the boiler; Figs. 8 and 9 are sections similar to Figs. 2 and 3, showing an arrangement of the brickwork which is inserted in converting the furnace from coal firing to oil firing only; Fig. 10 is a vertical section of the impeller plate and damper; Fig. 11 is a front view looking on the damper plate, and showing the ports full open for passage of air; Fig. 12 is a front view of the impeller plate with the damper removed; Fig. 13 is a plan view showing the vanes or deflectors on the back of the impeller plate; Fig. 14 is a vertical longitudinal section through the air mixers of a boiler furnace for oil firing and provided with a modified form of air mixer or distributer; Fig. 15 is a sectional elevation on the line G—H of Fig. 14, looking in the direction of the arrows; Fig. 16 is a sectional plan view of the air mixer illustrated in Fig. 14; Fig. 17 is a vertical longitudinal section through the air mixer of a furnace fitted for oil firing and provided with an air distributing arrangement similar to that illustrated in connection with the coal firing in Fig. 2; Fig. 18 is a sectional end elevation taken on the line K—L in Fig. 17, and looking in the direction of the arrows; Fig. 19 is a detail view taken on the line M—N of Fig. 18, and Fig. 20 is a sectional elevation illustrating the air distributers or mixers of the general type shown in Figs. 17 to 19 applied to a furnace suitable for firing with either coal or oil.

Throughout the several views of the drawings, similar reference characters indicate similar parts.

Referring to Figs. 1 to 6, A denotes the furnace front wall, B the rear wall, C the ash pit and D the grate bars. Oil burners E, which are surrounded by air cones F alternate with fire-doors G for coal firing.

Located on a level with the ash pit and arranged on either side of the ash-pit openings X and beneath the oil burners are plates H fitted with a movable damper H' operated from the outside by a handle I for the control of the air supplied beneath the grate. Impeller plates H² on the plate H deflect the air as it enters, in lieu of allowing it to flow in streams, and serve to distribute uniformly the air entering through the plates H. The air box or air duct K, for the supply of air, is preferably formed integral with the boiler supporting structure. Within the air box or duct are provided dampers L adapted to control the supply of air to the oil burners E, while the damper H' controls the supply of air to the ash pits. A common duct thus serves both burners. The wing air cones may be inclined to the furnace wall, as indicated in Figs. 4, 5 and 6.

To convert the boiler from coal firing to oil firing, it is merely necessary to cover the grate bars with fire-bricks M, as indicated in dotted lines in Fig. 2, to open the damper L, and to close the damper H' by means of the handle I, and if desired to protect the fire-doors G by means of brickwork. In converting from oil firing to coal firing, the fire-brick M is removed, the burner opening closed, for example by means of a closing brick N, secured in place by means of a bolt O extending to the boiler front, the damper L closed and the damper H' opened.

In employing simultaneously coal and oil firing, the grate bars would be left as for coal firing, the oil burners left as for oil firing, and the air for both regulated by the damper L, and damper H' to suit the quantity and quality of each fuel to be burnt. In such circumstances, the bed of coal would form the protection for the grate bars.

In the construction shown in Fig. 7, the air box or duct K, the impeller plate H and the oil burners E are located at one end of the boiler, the fire door G being shown as located at the opposite end, though it might also be arranged at the same end of the boiler.

As shown in Figs. 8 and 9, I may, in lieu of covering the grate bars with fire-brick, as shown in Fig. 1, remove the grate bars and by providing a lining P of brickwork, convert the whole of the space into a combustion chamber. The fire-doors G may be protected also by a brickwork wall P' as previously described. Such an arrangement is particularly suitable when oil firing is to be continued over a considerable period of time.

In the embodiment of my invention illustrated in Figs. 14 to 16, K' denotes the air duct for supplying air under pressure to the boiler furnace, E' indicates the oil burner and F' an air mixer, the mixer shown being in the form of a truncated cone. Within the air duct K' is rotatably mounted a cylinder R arranged to fit over a cylinder S fixed within the air duct coaxially with the oil burner. The movable cylinders R and the fixed cylinder S are each provided with openings T and U, respectively, on their peripheral walls, so that on turning the movable cylinder by means of the handwheel V, the air may be shut off by bringing the openings T in the one cylinder opposite the metal of the other. As illustrated in Fig. 15, to one edge of each opening in one of the cylinders (cylinder S in the illustration) are attached deflecting vanes W in such manner as to cause uniform diffusion of the air inside the cylinder.

In the construction shown in Figs. 17 and 18, in which K² indicates the air duct, E² the burner, and F² the air mixer, the air distributer is shown as composed of a flat disk H³ disposed adjacent the inner side of the air duct and mounted for rotation with a spindle X' operable by a handle I', said disk H³ having openings H⁴ so spaced that the solid metal between them is sufficient to cover completely corresponding openings H⁵ in a fixed plate Z, which separates the air duct from the air chamber containing the burners, the disk H³ and the plate Z being arranged to fit against one another. The air is admitted from the air duct to the chamber containing the burners by uncovering the opening H⁵ by rotating the circular disk H³. To the fixed plate Z on one edge of each of the openings H⁵ are fixed deflecting vanes H⁶. In lieu of arranging the disk H³ to rotate, it may be arranged so as to be moved axially toward or from the face of the plate Z to control the quantity of air flowing to the openings H⁵. In such circumstances, the disk H³ may be solid.

In Fig. 20 both forms of the above described arrangements are shown applied for controlling the supply of air to the burner and the supply of air to the ash pits of furnaces suitable for firing with either coal or oil. As shown in that figure, the arrangement for controlling the supply of air to the burner consists of a solid plate H⁷, arranged to be moved by means of a handle I² toward and from a fixed perforated plate H⁸ with deflecting vanes to control the quantity of air flowing to the burner. A rotatable plate H⁹, such as shown in Fig. 17, is provided for controlling the supply of air to the ash pit, but, of course, this plate could be made solid and arranged to move axially along the spindle supporting it by means of a rod or rods projecting through the front plate.

I claim:

1. A boiler furnace adapted to burn either liquid or solid fuel, having a single front, said front having therein a solid fuel firing opening, an ash pit opening beneath said firing opening, an oil burner at one side of said firing opening and above the furnace grate with an air supply opening adjacent the burner, a solid fuel air supply opening below the grate and beneath the air supply opening for the oil burner, a vertical duct extending from the boiler room floor upward outside the furnace front and at one side of said ash pit opening and said firing opening and covering both air supply openings, and dampers in said duct, whereby air from the duct may be supplied to both said air supply openings or to either one alone.

2. A boiler furnace adapted to burn either liquid or solid fuel, having a single front, said front having therein a solid fuel firing opening, an oil burner at one side of said firing opening and above the furnace grate with an air supply opening adjacent the burner, a solid fuel air supply opening below the grate and beneath the air supply opening for the oil burner, a vertical duct extending from the boiler room floor upward outside the furnace front and at one side of said firing opening and covering both air supply openings, and dampers in said duct, whereby air from the duct may be supplied to both said air supply openings or to either one alone.

3. A boiler furnace adapted to burn either liquid or solid fuel, having a single front, said front having a solid fuel firing opening, an oil burner at each side of said firing opening and above the furnace grate, and a solid fuel air supply opening beneath each air supply opening for the oil burners and below the grate, a plurality of vertical ducts outside the furnace parts and each covering one of the solid fuel air supply openings and the oil burner air supply opening above it and located at one side of the solid fuel firing opening, and dampers in each duct, whereby air from the duct may be supplied to both the air openings with which it connects or to either one alone.

ARTHUR SPYER.

Witnesses:
HENRY PELHAM SMITH,
JOHN HARPER McKINLAY.